United States Patent
Stowasser

(10) Patent No.: US 9,430,826 B2
(45) Date of Patent: Aug. 30, 2016

(54) METHOD FOR REDUCING DIRECT HIT ARTIFACTS AND X-RAY FACILITY

(71) Applicant: Siemens Aktiengesellschaft, Munich (DE)

(72) Inventor: Boris Stowasser, Erlangen (DE)

(73) Assignee: SIEMENS AKTIENGESELLSCHAFT, Munich (DE)

( * ) Notice: Subject to any disclaimer, the term of this patent is extended or adjusted under 35 U.S.C. 154(b) by 120 days.

(21) Appl. No.: 13/851,181

(22) Filed: Mar. 27, 2013

(65) Prior Publication Data

US 2013/0259356 A1    Oct. 3, 2013

(30) Foreign Application Priority Data

Mar. 29, 2012  (DE) .................. 10 2012 205 051

(51) Int. Cl.
- *G06T 7/00* (2006.01)
- *G06T 5/00* (2006.01)
- *G06T 5/20* (2006.01)

(52) U.S. Cl.
CPC ............. *G06T 7/0012* (2013.01); *G06T 5/002* (2013.01); *G06T 5/20* (2013.01); *G06T 2207/10116* (2013.01); *G06T 2207/20012* (2013.01); *G06T 2207/20016* (2013.01)

(58) Field of Classification Search
None
See application file for complete search history.

(56) References Cited

U.S. PATENT DOCUMENTS

| | | | | |
|---|---|---|---|---|
| 5,617,461 A | * | 4/1997 | Schreiner | H04N 5/21 348/E5.077 |
| 6,497,511 B1 | * | 12/2002 | Schmitt | H04N 5/325 348/E5.081 |
| 7,801,274 B1 | | 9/2010 | Isaksen | 378/98 |
| 2005/0259889 A1 | * | 11/2005 | Ferrari | G06K 9/40 382/275 |
| 2006/0072128 A1 | * | 4/2006 | Ng | G06T 7/0083 358/1.9 |
| 2006/0210135 A1 | * | 9/2006 | Kanegae | A61B 6/4494 382/132 |
| 2008/0118022 A1 | * | 5/2008 | Hagiwara | A61B 6/032 378/4 |
| 2009/0034821 A1 | | 2/2009 | Onihashi et al. | 382/132 |
| 2009/0251553 A1 | * | 10/2009 | Cambell | G06F 3/0485 348/211.99 |

OTHER PUBLICATIONS

Wang, David C. C. et al., "Gradient Inverse Weighted Smoothing Scheme and the Evaluation of its Performance," Computer Graphics and Image Processing, vol. 15, No. 2, 16 pages, Feb. 1981.

Lee, John A. et al., "Edge-Preserving Filtering of Images with Low Photon Counts," IEEE Transactions on Pattern Analysis and Machine Intelligence, vol. 30, No. 6, 14 pages, Jun. 2008.

* cited by examiner

*Primary Examiner* — Utpal Shah
*Assistant Examiner* — Mai Tran
(74) *Attorney, Agent, or Firm* — Slayden Grubert Beard PLLC

(57) ABSTRACT

A method for reducing artifacts produced by x-ray radiation directly striking a measuring pixel of a CMOS detector after crossing a scintillator, wherein, for an x-ray image recorded using the CMOS detector, artifact image points are extracted by applying a local, edge-obtaining smoothing operator that evaluates image data of neighboring image points located in the vicinity of a considered image point and comparison with the image to which the smoothing operator was applied, and their image data is corrected.

21 Claims, 4 Drawing Sheets

METHOD FOR REDUCING DIRECT HIT ARTIFACTS AND X-RAY FACILITY

CROSS-REFERENCE TO RELATED APPLICATIONS

This application claims priority to DE Patent Application No. 10 2012 205 051.5 filed Mar. 29, 2012. The contents of which is incorporated herein by reference in its entirety.

TECHNICAL FIELD

The disclosure relates to a method for reducing artifacts produced by x-ray radiation directly striking a measuring pixel of a CMOS detector after crossing a scintillator, as well as a corresponding x-ray facility.

BACKGROUND

Detectors based on CMOS technology are already known in the prior art. They generally comprise a scintillation layer, made of cesium iodide (CSI) for example, in which incident x-ray radiation is to be converted to low-energy secondary radiation. The secondary radiation then strikes a pixel matrix with individual CMOS measuring pixels disposed below the scintillator, where the signal can be correspondingly measured. A CMOS detector also comprises electronic activation and read-out components and is frequently provided on the pixel matrix itself but can also be provided as additional components, with a first post-processing already being performed, for example an integration over the measuring time and an amplification. It is also conceivable for a CMOS detector to have a component for standardizing recorded x-ray images to a standard brightness. Further influences result due to the modulation transfer function (MTF) of the scintillator.

One disadvantage of CMOS detectors is the possibility of so-called direct hits. Here high-energy x-ray radiation is not converted by the scintillator to secondary radiation but strikes a measuring pixel directly, so that free charges can be generated. These result in a distorted signal response from the pixel, so that a measurement value that clearly deviates upward and therefore image data that clearly deviates upward result. Such interference can be restricted to a single pixel or a single image point of the two-dimensional x-ray image assigned to the pixel, but it is also conceivable for a number of adjacent pixels to be distorted. This produces artifacts, which manifest themselves for example as bright white dots in the final x-ray image.

Correction mechanisms known in the prior art are based mainly on the use of a number of images recorded one after the other in time, it being assumed that the errors only occur in an isolated manner in individual images and therefore it can be concluded from the image data in another x-ray image recorded at a different time whether an artifact is present. A correction method that can be implemented on an individual image is not yet known in the prior art.

SUMMARY

One embodiment provides a method for reducing artifacts produced by x-ray radiation directly striking a measuring pixel of a CMOS detector after crossing a scintillator, wherein, for an x-ray image recorded using the CMOS detector, artifact image points are extracted by applying a local, edge-obtaining smoothing operator that evaluates image data of neighboring image points located in the vicinity of a considered image point and comparison with the image to which the smoothing operator was applied, and their image data is corrected.

In a further embodiment, a mean value of the image data of the neighboring image points weighted with the inverse of the deviation from the image data of the considered image point is defined as the smoothing operator.

In a further embodiment, an x-ray image that has been transformed in a variance-stabilizing manner is used as the starting point for extracting the artifact image points, in particular an Anscombe-transform x-ray image.

In a further embodiment, an nth intermediate image and first to nth correction images are determined from a zeroth intermediate image corresponding to or derived from the x-ray image, in n steps with n>0, where in every mth step for every considered image point of theth intermediate image corresponding to a measuring pixel, the smoothing operator is applied with neighboring image points at a distance m from the considered image point in the row direction and/or column direction, to determine an mth intermediate image, whereupon an mth differential image is determined by subtracting the mth intermediate image from theth intermediate image and to determine the mth correction image the image data of the mth differential image is limited in an upward direction by an in particular variance-dependent threshold value, with the corrected x-ray image being determined as or from a sum of the nth intermediate image and the first to nth correction images.

In a further embodiment, n is greater than one, in particular equal to two or equal to three.

In a further embodiment, the threshold value is determined as a multiple of the variance of the image data in the differential image, in particular three to five times this.

In a further embodiment, a threshold value determined taking into account at least one detector property and/or one post-processing step is used as the threshold value.

In a further embodiment, wherein the mth intermediate image $L_m$ is determined by $$L_m(x,y) = \frac{\sum_{i=-1}^{1}\sum_{j=-1}^{1} w_{ij} \cdot L_{m-1}(x+m\cdot i, y+m\cdot j)}{\sum_{i=-1}^{1}\sum_{j=-1}^{1} w_{ij}}$$

where the weighting factor $w_{ij}$ is defined by $$w_{ij} = \begin{cases} \frac{1}{\max(s_{min}, |L_{m-1}(x+m\cdot i, y+m\cdot i) - L_{m-1}(x,y)|)} & \text{for } i, j \neq 0 \\ 0 & \text{for } i = j = 0 \end{cases}$$

where $s_{min}$ is a numerical limit variable, which is selected in particular as smaller than or equal to 0.00001.

Another embodiment provides an x-ray facility with a CMOS detector, having a scintillator and a pixel matrix with measuring pixels for receiving secondary radiation generated in the scintillator, and a computation facility, which is configured to perform any of the methods disclosed above.

BRIEF DESCRIPTION OF THE DRAWINGS

Exemplary embodiments will be explained in more detail below based on the schematic drawings, wherein.

DETAILED DESCRIPTION

Figure 1:
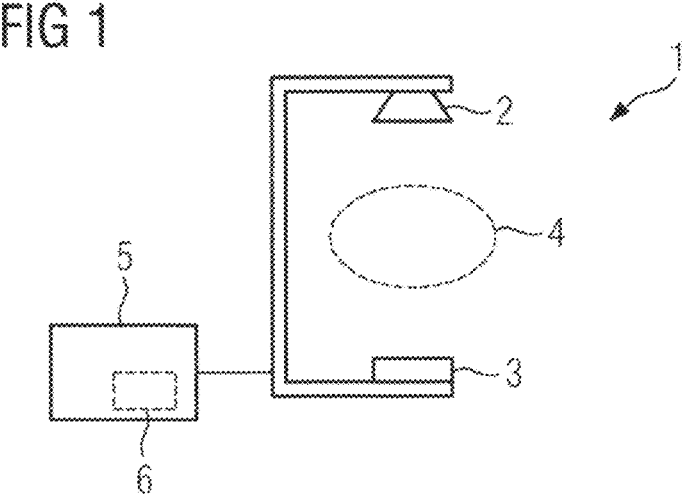
FIG. 1 shows an x-ray facility, according to some embodiments.

Embodiments of the present disclosure provide a correction method and device that can also be used for an individual x-ray image, which can significantly reduce image artifacts produced by direct hits.

Some embodiments provide a method for an x-ray image recorded using the CMOS detector, for artifact image points to be extracted by applying a local, edge-obtaining smoothing operator that evaluates image data of neighboring image points located in the vicinity of a considered image point and comparison with the image to which the smoothing operator was applied, and for their image data to be corrected.

The basic concept is therefore to consider every image point and to evaluate the vicinity of the image point to determine whether there is a clear deviation from the image data at the neighboring image points considered. It should however be ensured that edges and the like are maintained. When the local, edge-obtaining smoothing operator is applied to a considered image point, said smoothing operator considering the neighboring image points but only using the image point itself for the purpose of a comparison, then direct hit image points, therefore individual image points, which have a much higher value than the image points in the vicinity are "smoothed out", while other structures described by edges are maintained. If a comparison is now made with the original image, for example by subtraction, in contrast image points will be determined at which a hugely excessive amount of image data is present, therefore a greater probability of direct hit artifacts. Once extracted, these can be corrected, for example by reducing their image data. If for example, a subtraction image is considered, in which only artifact image points are present in addition to noise effects, a restriction can be applied for example over the subtraction image as a whole, allowing the image data of the artifact image points to be corrected. It is important here, as already pointed out, that the smoothing operator obtains edges, therefore other image structures are maintained and are therefore not accidentally considered as artifact image points during the comparison.

The disclosed technique may offer various advantages. On the one hand it is possible to allow a reduction of direct hit artifacts even in individual x-ray images, without requiring time-related information. Also the undistorted, artifact-free signal is not changed by the disclosed method, which means that intervention only takes place at artifact image points. It may therefore be possible to achieve much better image quality with the disclosed technique.

One embodiment provides a mean value of the image data of the neighboring image points weighted with the inverse of the deviation from the image data of the considered image point to be defined as the smoothing operator. The use of such a smoothing operator means that image points in the vicinity, which have a similarly large amount of image data to the currently considered image point, are included to a much greater degree in an intermediate image thus determined, so that a high value is only obtained at the considered image point when at least one similarly high value is present in the vicinity, specifically in the considered neighboring image points. If this is not so, as would be the case for example with a large amount of image data surrounded by lower amounts of image data in the case of a direct hit artifact, this high value is hidden in the intermediate image resulting from the application of the smoothing operator, as can be seen in the comparison. It is different however in the case of edges of actually visible structures, where equal quantities of image data are present in any case in the vicinity of an image point.

It should be pointed out again here that the neighboring image points do not necessarily have to be directly adjacent to a considered image point, as will be explained again in more detail with regard to the particularly advantageous multiscale approach as an embodiment of the present disclosure, which ultimately provides for a step by step increase in the distance.

One embodiment provides an x-ray image that has been transformed in a variance-stabilizing manner to be used as the starting point for extracting the artifact image points, in particular an Anscombe-transform x-ray image. The knowledge underlying this embodiment is that the artifact image points have to be distinguished from image points that deviate due to noise effects. The image data of the x-ray image is essentially Poisson distributed, if just the measurement is considered per se, in other words the noise is a function of the image data, specifically of the gray scale value, so that a threshold value for determining an image point as an artifact image point would be a function of the image data. This would complicate the method considerably, in particular requiring the use of look-up tables or complex calculations, particularly when considering properties of the detector and the post-processing steps. It is therefore proposed that the x-ray image should be transformed in such a manner that the variance, based on a Poisson statistic, is independent of the image data. Effects occurring in addition to the Poisson statistic, for example a linear scaling based on an amplification, then no longer have an influence or are negligibly small, as is the case for example in respect of electric noise during signal processing in the detector and the like.

The so-called Anscombe transform is recommended specifically in respect of a lack of dependence on image data when starting from a Poisson statistic. This is a variance-stabilizing transformation, which transforms a random variable with a Poisson distribution to an approximately standard Gaussian distribution. The Anscombe transform here is defined by $$x \mapsto 2\sqrt{x + \frac{3}{8}}, \tag{1}$$

where, after correction of the artifact image points, the inverse Anscombe transform $$y \mapsto \left(\frac{y}{2}\right)^2 - \frac{3}{8}, \tag{2}$$

of course then has to be applied. Here x, y stand for the image data.

One embodiment provides an nth intermediate image and first to nth correction images to be determined from a zeroth intermediate image corresponding to or derived from the x-ray image, in n steps with n>0, where in every mth step for every considered image point of the (m−1)th intermediate image corresponding to a measuring pixel, the smoothing operator is applied with neighboring image points at a distance m from the considered image point in the row direction and/or column direction, to determine an mth intermediate image, whereupon an mth differential image is determined by subtracting the mth intermediate image from the (m−1)th intermediate image and to determine the mth correction image the image data of the mth differential image is limited in an upward direction by an in particular variance-dependent threshold value, with the corrected x-ray image being determined as or from a sum of the nth intermediate image and the first to nth correction images. In the simplest instance it is therefore proposed for the x-ray image itself (or the x-ray image transformed in particular in a variance-stabilizing manner) as the zeroth intermediate image, to apply the smoothing operator to said zeroth intermediate image first, for every image point of the zeroth intermediate image. The result is a first intermediate image. In this, as described above, at least the direct hit artifacts are smoothed out, which affect just a single measuring pixel, therefore a single image point, and therefore have no such image points containing large quantities of image data in their vicinity. Differentiation leaves a differential image, in which only these individual artifact image points are contained in addition to noise effects. A threshold value is now provided for this, limiting the image data of said artifact image points but leaving the rest unsampled. The result is the first correction image. If n=1 now, summing the first intermediate image and the first correction image again gives the original image data of the zeroth intermediate image at all the image points apart from the artifact image points thus discovered, with only the artifact image points discovered by considering the direct vicinity of each image point having a much smaller quantity of image data.

While the disclosed method with n=1 already delivers good results for the improvement of image quality, as has already been indicated, direct hit artifacts frequently occur, which affect two (or more rarely more) adjacent image points. These are initially not discovered by the disclosed method with n=1 and consideration of just the image points that are adjacent in the rows and columns of the image matrix but are also more rare. In one particularly preferred embodiment of the disclosed method provision can however be made for the process affecting the immediate neighbors only to be a first step of a multiscale analysis of the x-ray image (or an image derived therefrom), so provision can be made for n>1, in particular =2 or =3. In such an instance a second and optionally further steps occur, in which rather than the immediate neighbors along the rows and columns of the image matrix being considered, consideration is given to neighboring image points that are further away, in particular initially next but one neighbors and the like in the second step. Therefore while in the first step with m=1 the edge-obtaining smoothing operator is applied in a 3×3 environment to the image matrix of the zeroth intermediate image, in a second step, in other words with m=2, the edge-obtaining smoothing operator is applied to the first intermediate image in a 5×5 environment, with the active region of the smoothing being enlarged for an image point by inserting "holes", in other words the immediately adjacent neighbors are no longer considered here. This allows structures to be smoothed out, in which for example two immediately adjacent image points have a clearly excessively large amount of image data due to a direct hit, providing a clear further improvement.

Experiments using the disclosed technique have shown that for an extremely significant image quality improvement it can generally be sufficient to select n=2, with it also being useful to use n=3, in which case the edge-obtaining smoothing operator is then ultimately applied to the second intermediate image in a 7×7 environment of the image matrix in the third step, with further "holes" ultimately occurring, as the next and next but one neighbors are no longer considered here. A further increase in n is conceivable but is only expedient in certain conditions, as there is an increasing risk of erroneously excluding actual image structures as the environments get larger.

It should be noted again here that within the context of the present disclosure constellations or relative arrangements of direct hit artifacts can occur, which are not covered by the algorithm; but this is a finite number of special instances that occur, which does not impede the significant reduction of direct hit artifacts.

Different approaches are conceivable for the threshold value used to determine the correction image. In one empirical approach provision can be made in a first alternative for the threshold value to be determined as a multiple of the variance of the image data in the differential image, in particular three to five times this. In this instance it is assumed that the image data that deviates due to direct hit artifacts is quite rare, so the "cutting off" of all image data above a threshold value, which corresponds to three to five times the variance of the image data in the differential image, brings about a significant improvement. Tests have shown that this very simple approach already produces excellent results with current CMOS detectors. It should be considered here in particular that this excellent effect is produced in particular in conjunction with a variance-stabilizing transformation, therefore the variance is not still present in a fluctuating manner as a function of the image data. This embodiment dispenses in particular with further computation steps, which would be necessary if the threshold value were made a function of a variance in the x-ray image or zeroth intermediate image.

In a second alternative embodiment it is however also possible to use a threshold value determined taking into account at least one detector property and/or one post-processing step as the threshold value. In particular when a variance-stabilizing transformation has been performed, it is conceivable also to select the threshold value as a function of the variance in the zeroth intermediate image, even if the Poisson statistic is impaired by effects of the detector or post-processing. The main influencing factors here can be an amplification generally already carried out in the detector, resulting in linear scaling, and a brightness regulation to a standard brightness, which brings about a second linear scaling. Effects like the MTF of the detector or electric noise in contrast have so little influence that they can also be ignored.

In one specific formulation of the smoothing operator provision can be made for the mth intermediate image $L_m$ to be determined by $$L_m(x, y) = \frac{\sum_{i=-1}^{1} \sum_{j=-1}^{1} w_{ij} \cdot L_{m-1}(x + m \cdot i, y + m \cdot j)}{\sum_{i=-1}^{1} \sum_{j=-1}^{1} w_{ij}} \quad (3)$$

where the weighting factor $w_{ij}$ is defined by $$w_{ij} = \begin{cases} \frac{1}{\max(s_{min}, |L_{m-1}(x + m \cdot i, y + m \cdot i) - L_{m-1}(x, y)|)} & \text{for } i, j \neq 0 \\ 0 & \text{for } i = j = 0 \end{cases} \quad (4)$$

where $s_{min}$ is a numerical limit variable, which is selected in particular as smaller than or equal to 0.00001. The image data of the neighboring image points is weighted here in each instance with the inverse amount of its distance from the image data of the considered image point, with a restriction being defined for the size of the weighting factor $w_{ij}$ to avoid execution problems with a computation facility executing the disclosed method, in particular also to avoid a division by 0. For example $s_{min}$ can be selected to be 0.00001.

In other words, in this specific embodiment defined by the formulae (3) and (4) a weighted mean value of the image data of the neighboring image points is calculated, with the weight being inversely proportional to the gray scale value distance of the neighboring image point from the central image point.

In addition to the method some embodiments provide an x-ray facility with a CMOS detector, having a scintillator and a pixel matrix with measuring pixels for receiving secondary radiation generated in the scintillator and a computation facility, which is configured to perform the disclosed method. Any of the disclosed embodiments of the method can be applied in a similar manner to the disclosed x-ray facility, so that the disclosed advantages can also be achieved therewith.

Such an x-ray facility therefore comprises, in addition to a suitable x-ray radiation source, a CMOS detector, which optionally outputs processed x-ray images, as described above. The disclosed method, which may be performed totally automatically by the computation facility, can in principle be added for example as a further post-processing step to recorded x-ray images, as modifications are made in particular only at image points which show direct hit artifacts. Activatability or deactivatability of the disclosed method for reducing direct hit artifacts on the part of the user is of course also conceivable. The computation facility can therefore be part of an image computer of the x-ray facility and be implemented by hardware and/or software components of the disclosed method, it being also possible of course in the process to entrust computation facilities that are not provided as part of the image computer with the performance of the disclosed method, in particular also outside x-ray facilities, for example at a post-processing or viewing station.

FIG. 1 shows a basic outline of an x-ray facility 1 according to certain embodiments. It has a recording arrangement in the form of an x-ray emitter 2 and a CMOS detector 3 disposed to receive the x-ray beams from the x-ray emitter 2. An object 4 to be recorded can be disposed between the x-ray emitter 2 and the CMOS detector 3.

The operation of the x-ray facility 1 is controlled by an outlined control facility 5, which in the present instance also comprises a computation facility 6, which includes computer instructions stored in tangible computer-readable storage media and executable by a processor to perform the disclosed method for reducing direct hit artifacts.

Figure 2:
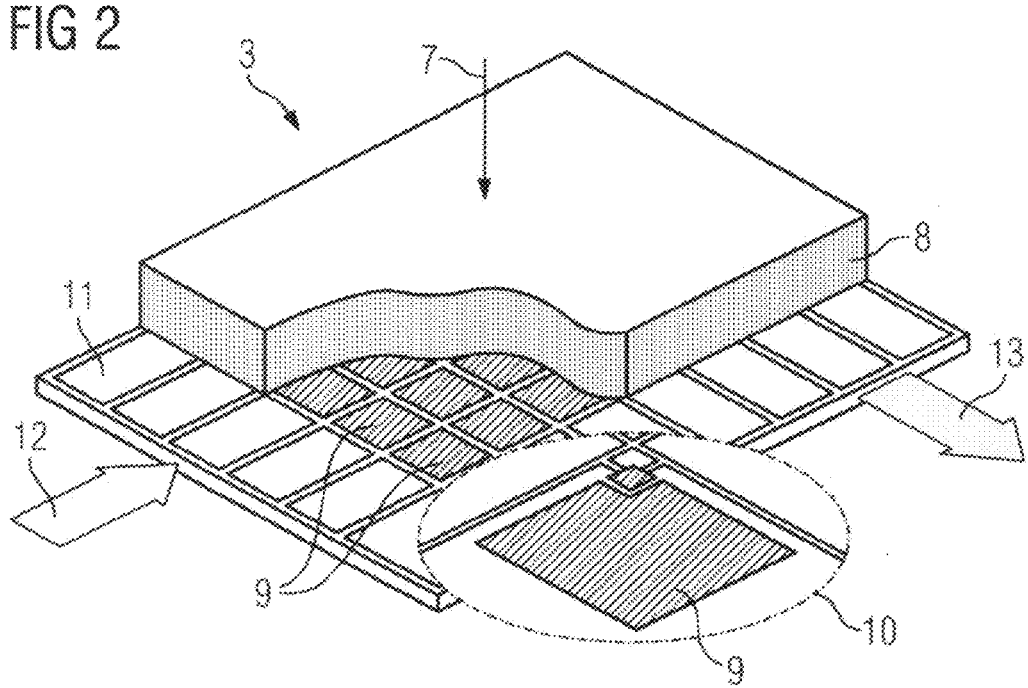
FIG. 2 shows a basic outline of the CMOS detector of the x-ray facility according to FIG. 1.

The x-ray detector 3 is now described in more detail with reference to FIG. 2. As shown by an arrow 7, the x-ray radiation first strikes a scintillator block 8, where it is to be converted to low-energy secondary radiation. The scintillator 8 is shown opened up at one point to show measuring pixels 9, which are intended to measure the resulting secondary radiation according to the known principle of CMOS detectors. A measuring pixel 9 is shown enlarged in the detail 10. The measuring pixels 9 are provided in the manner of a matrix on a pixel matrix 11, configured for example as a printed circuit board, which can also already hold parts of the electronic activation and read-out system. In the present instance the arrow 12 indicates the action of a row driver and the arrow 13 the reading out of the columns.

It can now happen with the CMOS detector 3 that x-ray radiation crosses the scintillator 8 without being converted to secondary radiation, so that an x-ray quantum can strike a measuring pixel 9 directly. Such a so-called "direct hit" produces a false, excessively high measurement signal. This is also manifested as an interfering artifact at an image point assigned to the measuring pixel 9 in a recorded x-ray image. The disclosed method performed by the computation facility 6 therefore aims to eliminate such direct hit artifacts occurring due to the excessively large amount of image data as far as possible.

Figure 3:
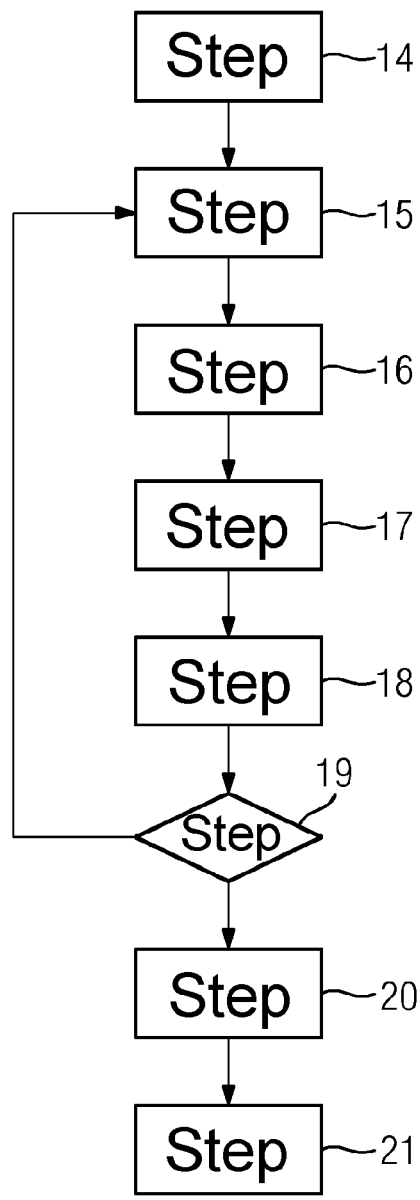
FIG. 3 shows a flow diagram of the disclosed method.

A flow diagram of an exemplary embodiment of the method is shown in FIG. 3. A multiscale analysis, initially summarized in general terms, is performed, in which a local, edge-obtaining smoothing operator that evaluates certain neighboring image points of a considered image point is applied repeatedly, to extract artifact image points, at which a direct hit artifact is present, and correct them by reducing their image data.

In a step 14 here however an Anscombe transform according to formula (1) is first applied to the x-ray image to be corrected, to obtain an x-ray image transformed in a variance-stabilizing manner as the zeroth intermediate image, in the following $L_0$. Based on the zeroth intermediate image $L_0$ artifact image points are extracted and corrected in a number of steps which each relate to different neighboring image points. To this end in a step 15 the method enters a loop, in which a value m for a loop passage is increased by three in the example illustrated here up to a value n. In this process in a step 16 an mth intermediate image is determined from the (m−1)th intermediate image by applying the smoothing operator, in a step 17 the mth intermediate image is subtracted from the (m−1)th intermediate image to determine a differential image, after which in a step 18 to determine an mth correction image the image data of the differential image is restricted to values below three times the variance of the image data in the differential image. In other words the excessively large amount of image data of the artifact image points is so to speak "cut off" here. In a step 19 it is checked whether or not the last (nth) step has already been passed through. If not, m is increased by 1 and steps 16-18 are passed through again with the increased m.

In a step 20 a corrected intermediate image is determined, in which all the correction images, in other words the first to nth correction images, are again added to the nth intermediate image.

In a step 21 the corrected x-ray image is obtained by applying the inverse Anscombe transform according to formula (2).

The loop passage (steps 15-19) will be explained specifically again in more detail, with in particular the first passage (m=1) being explained again in more detail with reference to FIGS. 4-6. Intermediate images here are in principle designated as $L_m$, differential images as $H_m$ and correction images as $H'_m$, where m=1 ... n and n=3.

Figure 4:
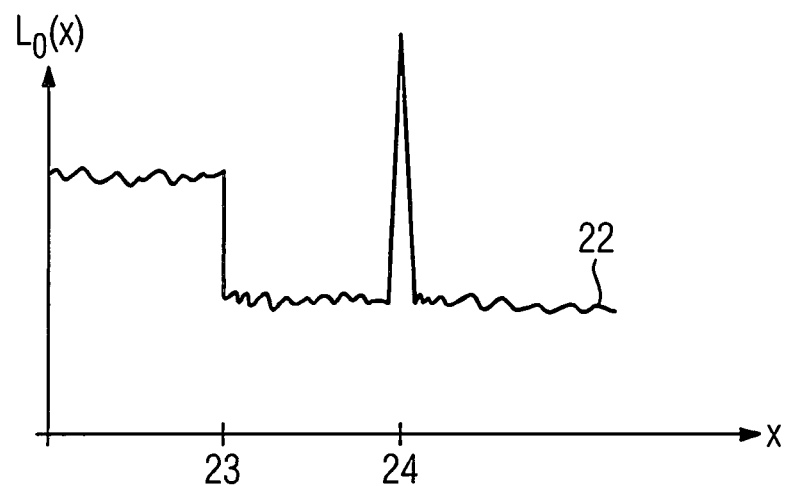
FIG. 4 shows a possible image data profile along a row in a zeroth intermediate image.

FIG. 4 shows an exemplary profile 22 of image data along a row, described here by the image coordinate x, of the zeroth intermediate image $L_0$. An edge is visible at point 23 and at point 24 image data is visible that clearly deviates in an upward direction, occurring here as a result of a "direct hit".

With m=1, in other words a first passage through the loop, provision is now made to determine a first intermediate image $L_1$ according to the following formulae (5) and (6), which follow from the formulae (3) and (4) for m=1.

$$L_1(x, y) = \frac{\sum_{i=-1}^{1}\sum_{j=-1}^{1} w_{ij} \cdot L_{m-1}(x+i, y+j)}{\sum_{i=-1}^{1}\sum_{j=-1}^{1} w_{ij}} \quad (5)$$

$$w_{ij} = \begin{cases} \frac{1}{\max(s_{min}, |L_0(x+i, y+i) - L_0(x, y)|)} & \text{for } i, j \neq 0 \\ 0 & \text{for } i = j = 0 \end{cases} \quad (6)$$

Here $s_{min}$, has been set to 0.000001. Therefore in this instance all eight immediately adjacent neighboring image points (of the eight neighborhood or Moore neighborhood) are considered and the weighted mean value is formed from their image data, with the weighting factor $w_{ij}$ resulting as the inverse of the distance of the image data of the neighboring image point from the currently considered image point. The effect of this smoothing operator is shown in FIG. 5, which shows the profile 25 of the image data along the same image matrix row in the first intermediate image $L_1$. The edge at point 23 is clearly still present but none of the immediate neighbors around the considered image point have such a large amount of image data at point 24 so the one instance of an excessively large amount of image data according to FIG. 4 has disappeared.

Figure 5:
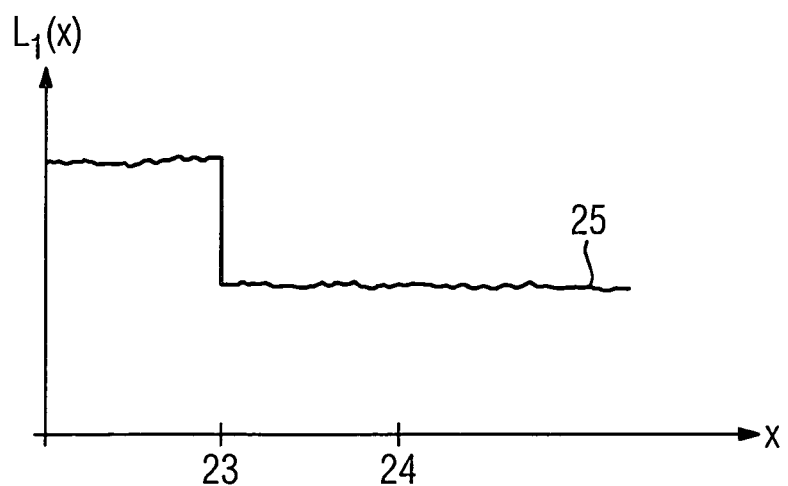
FIG. 5 shows a possible image data profile in a row along a first intermediate image.
Figure 6:
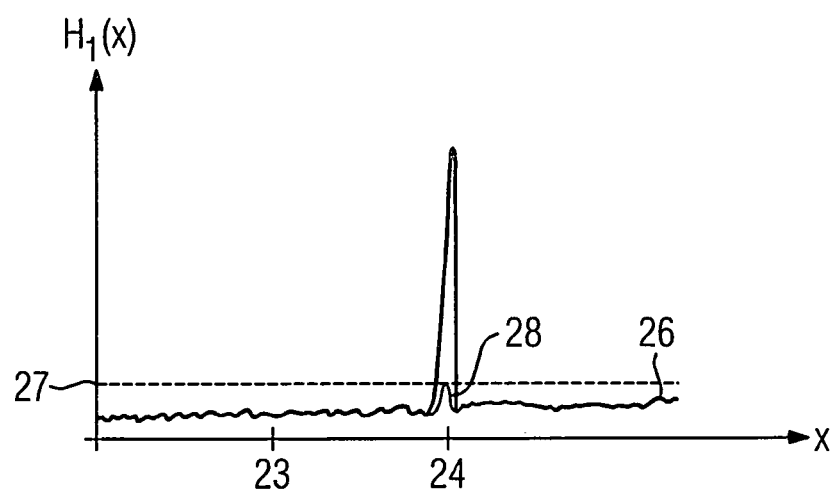
FIG. 6 shows a possible pixel profile in a row in a first differential image.

If we now calculate a first differential image $H_1$ as $$H_1 = L_0 - L_1 \quad (7)$$

a profile 26 results, as shown in FIG. 6, which corresponds to the same rows as FIGS. 4 and 5. While all the image structures, for example the edge at point 23, have disappeared, the excessively high value from $L_0$ remains prominent in the first differential image $H_1$ just at point 24. An artifact image point has therefore been extracted and can now be corrected. This is done using a threshold value 27, which in this instance has been selected as three times the variance of the image data in the first differential image $H_1$. In other exemplary embodiments however it is also conceivable to select the threshold value 27 as a function of the variance of the image data in the zeroth intermediate image $L_0$, with detector properties and post-processing steps being taken into account.

Once all the image data above the threshold value 27 has been "cut off", so the image data at the image point corresponding to point 24 is set to the threshold value 27, the profile indicated at 28 results in the resulting first correction image $H_1$.

Figure 7:
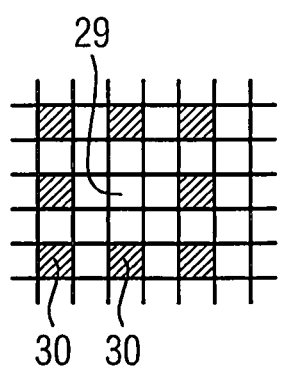
FIG. 7 shows an outline to determine the neighboring image points in a second step of a multiscale analysis.

In this passage for m=1 a 3×3 environment of each image point has been affected by the operator. However it can happen that measuring pixels 9 affected by a "direct hit" and therefore image points occur in an adjacent manner, which is why next but one neighbors are now considered with m=2 within the context of the multiscale analysis. The effect of the smoothing operator is then $$L_2(x, y) = \frac{\sum_{i=-1}^{1}\sum_{j=-1}^{1} w_{ij} \cdot L_1(x+2 \cdot i, y+2 \cdot j)}{\sum_{i=-1}^{1}\sum_{j=-1}^{1} w_{ij}} \quad (8)$$

$$w_{ij} = \begin{cases} \frac{1}{\max(s_{min}, |L_1(x+2 \cdot i, y+2 \cdot i) - L_1(x, y)|)} & \text{for } i, j \neq 0 \\ 0 & \text{for } i = j = 0 \end{cases} \quad (9)$$

to determine the second intermediate image $L_2$, with the neighboring image points 30 of a just processed image point 29 taken into account in the process shown hatched in FIG. 7 for clarification. A 5×5 environment is now considered, the smoothing operator being extended by inserting "holes".

As immediate adjacent neighbors of the image point 29 just considered are not included in the mean value formation, two artifact image points that are disposed adjacent to one another and have an excessively large amount of image data are extracted in the subsequent determination of the differential image $$H_2 = L_1 - L_2 \quad (10)$$

and can, as already described in relation to FIG. 6, also be corrected to a smaller amount of image data, with all the other image data remaining uninfluenced.

This procedure is now repeated in a third passage (m=2) for a 7×7 environment, where only next but next but one neighbors are considered, thereby providing a third correction image $H'_3$ in addition to a third intermediate image $L_3$.

The result of these three passages is therefore finally the third intermediate image $L_3$ and three correction images $H'_1$, $H'_2$, $H'_3$. In order to obtain a corrected intermediate image $L_{corr}$, the formula $$L_{corr} = L_n - \sum_{m=1}^{n} H'_m \quad (11)$$

is evaluated (for n=3 of course here). When the inverse Anscombe transform is now applied to the corrected intermediate image according to step 21 in FIG. 3, a corrected and artifact-reduced x-ray image results.

Although the invention has been illustrated and described in greater detail using the preferred exemplary embodiment, the invention is not restricted by the disclosed examples and other variations can be derived therefrom by the person skilled in the art, without departing from the scope of protection of the invention.

LIST OF REFERENCE CHARACTERS

1 X-ray facility
2 X-ray emitter

3 CMOS detector
4 Object
5 Control facility
6 Computation facility
7 Arrow
8 Scintillator
9 Measuring pixel
10 Detail
11 Pixel matrix
12 Arrow
13 Arrow
14 Step
15 Step
16 Step
17 Step
18 Step
19 Step
20 Step
21 Step
22 Profile
23 Point
24 Point
25 Profile
26 Profile
27 Threshold value
28 Profile
29 Image point
30 Neighboring image point

What is claimed is:

1. A method for reducing artifacts produced by x-ray radiation directly striking a measuring pixel of a CMOS detector after crossing a scintillator, comprising:
extracting artifact image points from an x-ray image profile recorded using the CMOS detector by performing an iterative process including one or more executions of the following steps:
applying a local, edge-obtaining smoothing operator that evaluates image data of neighboring image points located in the vicinity of a considered image point to generate a smoothed image profile,
calculating a differential image by subtracting the smoothed image profile from the x-ray image profile to which the smoothing operator was applied,
comparing the calculated differential image to a threshold value,
identifying artifact image points based on the results of the comparison of the calculated differential image to the threshold value, and
for each identified artifact image point, adjusting but not deleting the image data associated with that artifact image point based on the threshold value to generate a correction image, wherein the adjustment of the image data comprises reducing a magnitude of a peak associated with the artifact image point to a reduced magnitude that corresponds with the threshold value used for identifying the artifact image point; and
using the correction image including the adjusted but not deleted image data associated with the identified artifact image points to correct the x-ray image profile.

2. The method of claim 1, wherein a mean value of the image data of the neighboring image points weighted with the inverse of the deviation from the image data of the considered image point is defined as the smoothing operator.

3. The method of claim 1, wherein an x-ray image that has been transformed in a variance-stabilizing manner is used as the starting point for extracting the artifact image points, in particular an Anscombe-transform x-ray image.

4. The method of claim 1, comprising:
determining an nth intermediate image and first to nth correction images from a zeroth intermediate image corresponding to or derived from the x-ray image, in n steps with n>0,
in every mth step for every considered image point of the (m−1)th intermediate image corresponding to a measuring pixel, applying the smoothing operator with neighboring image points at a distance m from the considered image point in the row direction and/or column direction, to determine an mth intermediate image,
determining an mth differential image by subtracting the mth intermediate image from the (m−1)th intermediate image, wherein to determine the mth correction image the image data of the mth differential image is limited in an upward direction by an in particular variance-dependent threshold value, and
determining the corrected x-ray image as or from a sum of the nth intermediate image and the first to nth correction images.

5. The method of claim 4, wherein n is greater than one.

6. The method of claim 5, wherein n=2.

7. The method of claim 5, wherein n=3.

8. The method of claim 1, wherein the threshold value is determined as a multiple of the variance of the image data in the differential image.

9. The method of claim 1, wherein the threshold value is determined as a multiple of the variance of the image data in the differential image, wherein the multiple is between 3 and 5.

10. The method of claim 1, comprising determining a threshold value based on at least one detector property.

11. The method of claim 1, wherein a post-processing step is used as the threshold value.

12. The method of claim 4, wherein the mth intermediate image $L_m$ is determined by $$L_m(x, y) = \frac{\sum_{i=-1}^{1} \sum_{j=-1}^{1} w_{ij} \cdot L_{m-1}(x + m \cdot i, y + m \cdot j)}{\sum_{i=-1}^{1} \sum_{j=-1}^{1} w_{ij}}$$

where the weighting factor $w_{ij}$ is defined by $$w_{ij} = \begin{cases} \frac{1}{\max(s_{min}, |L_{m-1}(x + m \cdot i, y + m \cdot i) - L_{m-1}(x, y)|)} & \text{for } i, j \neq 0 \\ 0 & \text{for } i = j = 0 \end{cases}$$

where $s_{min}$ is a numerical limit variable, which is selected in particular as smaller than or equal to 0.00001.

13. An x-ray facility comprising:
a CMOS detector having a scintillator and a pixel matrix with measuring pixels for receiving secondary radiation generated in the scintillator, and
a computation device configured to:
extract artifact image points from an x-ray image profile recorded using the CMOS detector by performing an iterative process including one or more executions of the following steps:

applying a local, edge-obtaining smoothing operator that evaluates image data of neighboring image points located in the vicinity of a considered image point to generate a smoothed image profile, calculating a differential image by subtracting the smoothed image profile from the x-ray image profile to which the smoothing operator was applied, comparing the calculated differential image to a threshold value, identifying artifact image points based on the results of the comparison of the calculated differential image to the threshold value, and for each identified artifact image point, adjusting but not deleting the image data associated with that artifact image point based on the threshold value to generate a correction image, wherein the adjustment of the image data comprises reducing a magnitude of a peak associated with the artifact image point to a reduced magnitude that corresponds with the threshold value used for identifying the artifact image point; and use the correction image including the adjusted but not deleted image data associated with the identified artifact image points to correct the x-ray image profile.

14. The x-ray facility of claim 13, wherein a mean value of the image data of the neighboring image points weighted with the inverse of the deviation from the image data of the considered image point is defined as the smoothing operator.

15. The x-ray facility of claim 13, wherein an x-ray image that has been transformed in a variance-stabilizing manner is used as the starting point for extracting the artifact image points, in particular an Anscombe-transform x-ray image.

16. The x-ray facility of claim 13, wherein the computation device is configured to:

determine an nth intermediate image and first to nth correction images from a zeroth intermediate image corresponding to or derived from the x-ray image, in n steps with n>0, in every mth step for every considered image point of the (m−1)th intermediate image corresponding to a measuring pixel, applying the smoothing operator with neighboring image points at a distance m from the considered image point in the row direction and/or column direction, to determine an mth intermediate image, determine an mth differential image by subtracting the mth intermediate image from the (m−1)th intermediate image, wherein to determine the mth correction image the image data of the mth differential image is limited in an upward direction by an in particular variance-dependent threshold value, and determine the corrected x-ray image as or from a sum of the nth intermediate image and the first to nth correction images.

17. The x-ray facility of claim 16, wherein n is greater than one.

18. The x-ray facility of claim 13, wherein the threshold value is determined as a multiple of the variance of the image data in the differential image.

19. The x-ray facility of claim 13, wherein the threshold value is determined as a multiple of the variance of the image data in the differential image, wherein the multiple is between 3 and 5.

20. The method of claim 1, wherein reducing a magnitude of a peak associated with the artifact image point as a function of the threshold value comprises reducing the magnitude of the peak associated with the artifact image point to a magnitude corresponding to the threshold value.

21. The x-ray facility of claim 13, wherein the computation device is configured to reduce a magnitude of a peak associated with the artifact image point as a function of the threshold value by reducing the magnitude of the peak associated with the artifact image point to a magnitude corresponding to the threshold value.

* * * * *